United States Patent [19]

Gautier et al.

[11] Patent Number: 5,442,917
[45] Date of Patent: Aug. 22, 1995

[54] FORCE TRANSMISSION DEVICE WITH FLAT SUPPORT

[75] Inventors: Jean Pierre Gautier; Ulysse Verbo, both of Aulnay-Sous-Bois; Perez Revilla, Argenteuil, all of France

[73] Assignee: Bendix Europe Services Techniques, Drancy, France

[21] Appl. No.: 90,063

[22] PCT Filed: Jun. 14, 1993

[86] PCT No.: PCT/FR93/00563

§ 371 Date: Jul. 23, 1993

§ 102(e) Date: Jul. 23, 1993

[87] PCT Pub. No.: WO94/01312

PCT Pub. Date: Jan. 20, 1994

[30] Foreign Application Priority Data

Jul. 8, 1992 [FR] France .................. 92 08420

[51] Int. Cl.⁶ ............................................. B60T 13/20
[52] U.S. Cl. .......................................... 60/554; 91/369.2
[58] Field of Search ................ 60/547.1, 552, 554; 91/369.2, 369.3

[56] References Cited

U.S. PATENT DOCUMENTS

| | | | |
|---|---|---|---|
| 3,040,535 | 6/1962 | Randol | 60/554 |
| 3,094,844 | 6/1963 | Helvern | 60/552 |
| 4,453,380 | 6/1984 | Meynier | 60/547.1 |
| 4,506,592 | 3/1985 | Shimamura | 91/369.3 |
| 4,856,412 | 8/1989 | Kawasumi et al. | 91/369.2 |
| 4,984,506 | 1/1991 | Perez | 91/369.2 |

*Primary Examiner*—F. Daniel Lopez
*Attorney, Agent, or Firm*—Larry J. Palguta; Leo H. McCormick, Jr.

[57] ABSTRACT

A pneumatic brake booster has a thrust rod (13) guided by a sleeve (16) supported by a hydraulic piston (14) of a master cylinder (2). The thrust rod has a thrust washer (15) fixedly attached, which bears against a flat bottom of a cup (12) housing a reaction disc (11). The thrust washer is able to slide relative to the flat bottom.

2 Claims, 1 Drawing Sheet

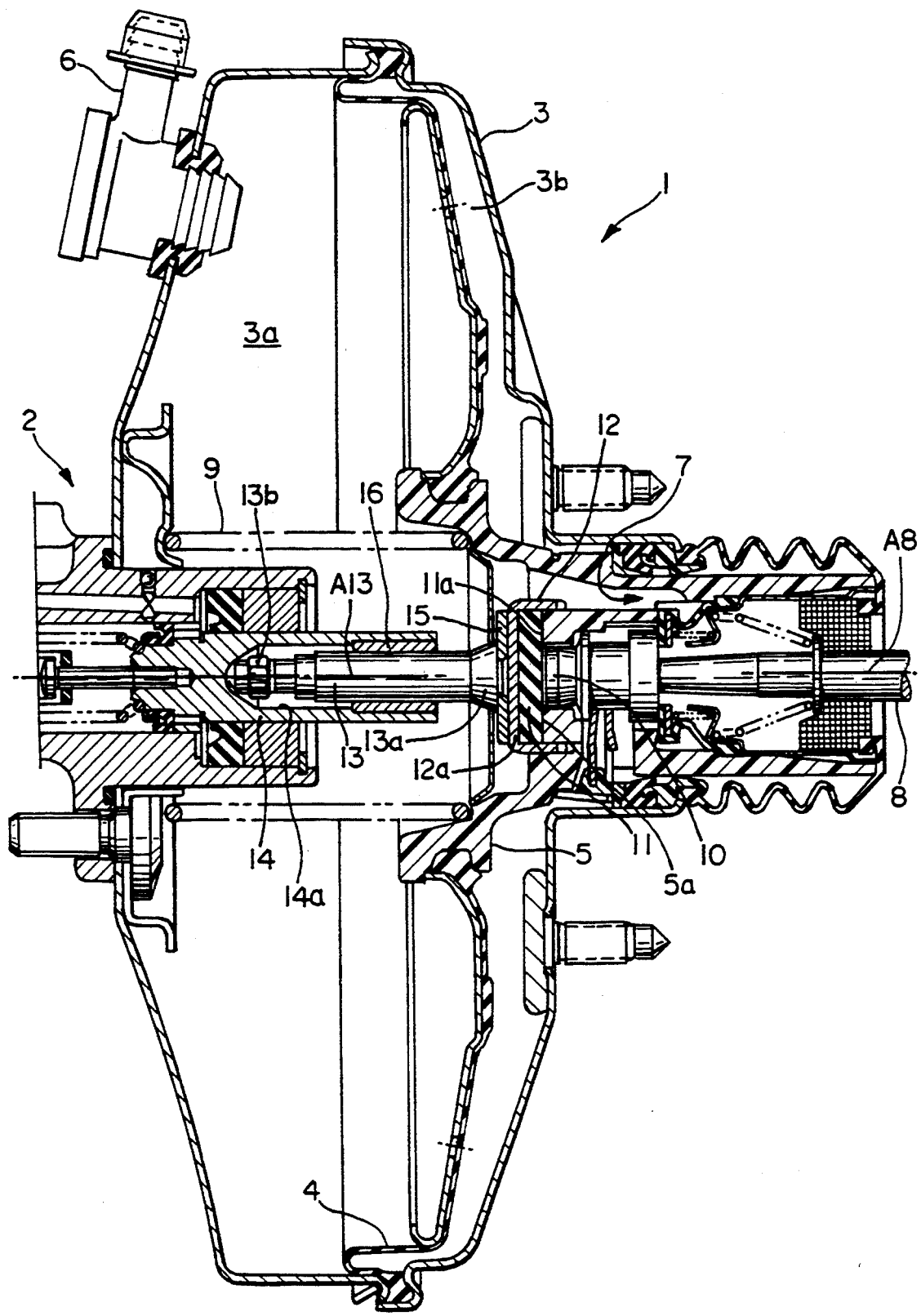

FORCE TRANSMISSION DEVICE WITH FLAT SUPPORT

The present invention relates to a force transmission device for an assembly consisting of a pneumatic brake-booster and of a master cylinder, comprising:

a control rod capable, starting from a resting position, of undergoing a movement in an axial direction under the effect of an input force, this rod being terminated by a plunger;

a pneumatic piston movable in this axial direction, from a resting position, under the effect of a pressure differential controlled by the axial movement of the control rod, this pneumatic piston having an axial annular surface which surrounds the plunger;

a reaction disk housed in a cup with flat bottom and having a free face onto which the axial annular surface of said pneumatic piston and the plunger are capable of applying output forces;

a substantially axial thrust rod a first end of which receives these output forces and another end of which retransmits them to a hydraulic piston of the master cylinder; and retaining means for ensuring that the thrust rod maintains a substantially axial direction.

Such a device is for example described in U.S. Pat. No. 4,984,506 and well known in the prior art.

In a general way, brake-boosters and the master cylinders which are associated therewith are mass-produced and are for this reason subject to very delicate compromises as far as the cost and the precision of production are concerned.

This leads in particular to major difficulties in obtaining a perfect alignment of the thrust rod with the control rod, without which deformations under stress, followed by irreversible damage to the booster may appear.

The object of the present invention is to provide simple and economical means for avoiding the detrimental consequences of such a lack of perfect alignment.

To this end, the device of the invention is essentially characterized in that the thrust rod is securely attached, at its first end, to a flat thrust washer coming to bear, with the possibility of a relative sliding, against the flat bottom of said cup, and in that said retaining means are borne by the master cylinder.

In the case where the hydraulic piston of the master cylinder has an axial cylindrical bore into which the second end of the thrust rod enters, said retaining means preferably comprise a restriction of the internal diameter of this bore, adapted to limit the possibility of the thrust rod deviating from said axial direction.

The invention will now be described by way of example with reference to the accompanying single FIGURE which is a view in partial cross section of a device according to the invention.

Insofar as the invention relates only to an improvement made to pneumatic brake-booster systems, and insofar as the general constitution and operation of these systems are well known to the person skilled in the art, these systems will be rapidly recalled here only in order to provide a total understanding of the improvement which the invention represents.

In a simplified manner, a system of this type comprises a booster 1 and a master cylinder 2.

The booster per se comprises a rigid casing 3 separated into two chambers 3a and 3b, in leaktight manner, by a membrane 4 securely attached to a pneumatic piston 5 movable inside the casing.

The front chamber 3a, the front face of which is closed in leaktight manner by the master cylinder 2, is permanently connected to a partial vacuum source (not shown) through a union 6.

The pressure in the back chamber 3b is controlled by a valve 7, controlled by a control rod 8, which is connected to the brake pedal.

When the control rod 8 is in resting position, in this case pulled toward the right, the valve 7 establishes a communication between the two chambers 3a and 3b of the booster.

The back chamber 3b then being subject to the same partial vacuum as the front chamber 3a, the piston 5 is pushed back toward the right, in resting position, by a spring 9.

The actuation of the control rod 8 toward the left has the effect, in a first stage, of moving the valve 7 so that it isolates one of the chambers 3a and 3b from the other and then, in a second stage, of moving this valve so that it opens the back chamber 3b to atmospheric pressure.

The pressure differential between the two chambers then sensed by the membrane 4 exerts on the piston 5 a thrust which tends to move it toward the left compressing the spring 9.

The braking force which the control rod 8 exerts, through the intermediary of a plunger 10, with the master cylinder as its destination, and the brake boost force resulting from the thrust of the piston 5, are applied onto the upstream (right) face 11a of a reaction disk 11 housed in a cup 12 adapted to retransmit these forces to a thrust rod 13, which has the function of actuating a hydraulic piston 14 of the master cylinder.

The invention relates essentially to the force transmission chain constituted by, together, the control rod 8, the plunger 10, the piston 5, the reaction disk 11, the cup 12, the thrust rod 13 and the hydraulic piston 14.

As shown in the FIGURE, the piston 5 bears against the reaction disk 11 through an axial annular surface 5a which surrounds the plunger 10.

The cup 12 is of essentially cylindrical shape and has a flat bottom 12a, perpendicular to the longitudinal axis A8 of the control rod, and against the entire internal surface of which bears the reaction disk 11.

According to the invention, the thrust rod 13 is, at the first of its ends 13a, securely attached to a flat thrust washer 15 perpendicular to the longitudinal axis A13 of the thrust rod 13 and coming to bear, with the possibility of a relative sliding, against the flat bottom 12a of the cup 12, and retaining means are provided on the master cylinder 2 so as to ensure that the longitudinal axis A13 of this thrust rod 13 remains substantially parallel to the longitudinal axis A8 of the control rod 8.

As the hydraulic piston 14 of the master cylinder generally comprises an axial cylindrical bore 14a into which the second end 13b of the thrust rod 13 enters, the retaining means may take the form of a sleeve 16 inserted into the bore 14a so as to restrict the internal diameter thereof to a value hardly greater than that of the external diameter of the thrust rod 13, so as to limit the possibility of the latter adopting a position in which the directions of the axes A8 and A13 are very different.

By virtue of this disposition, the forces applied by the control rod 8 and the pneumatic piston 5 toward the hydraulic piston 14 tend to orientate the axes A8 and A13 parallel to one another, even when the latter have a slight offset which prevents them from being strictly merged.

We claim:

1. A force transmission device of an assembly consisting of a pneumatic brake-booster and a master cylinder, comprising:

a control rod capable, starting from a resting position, of undergoing a movement in an axial direction under the effect of an input force, the rod being terminated by a plunger probe;

a pneumatic piston movable in the axial direction, from a resting position, under the effect of a pressure differential controlled by the axial movement of the control rod, the pneumatic piston having an axial annular surface which surrounds the plunger probe;

a reaction disk housed in a cup having a flat bottom and having a free face onto which the axial annular surface of said pneumatic piston and the control rod are capable of applying output forces;

a substantially axial thrust rod a first end of which receives the output forces and another end of which retransmits the output forces to a hydraulic piston of the master cylinder; and retaining means for ensuring that the thrust rod maintains a substantially axial direction, characterized in that the thrust rod is attached securely, at the first end, to a flat thrust washer coming to bear, with the possibility of a relative sliding, against the flat bottom of said cup, and in that said retaining means is borne by the master cylinder.

2. The device according to claim 1, characterized in that the hydraulic piston of the master cylinder has an axial cylindrical bore into which the second end of the thrust rod enters, said retaining means comprises a restriction of an internal diameter of the bore, the restriction adapted to limit the possibility of the thrust rod deviating from said axial direction.

* * * * *